G. W. HOAR.
CANOPY FOR ELECTRIC LIGHT FIXTURES.
APPLICATION FILED OCT. 22, 1920.
1,380,147.
Patented May 31, 1921.
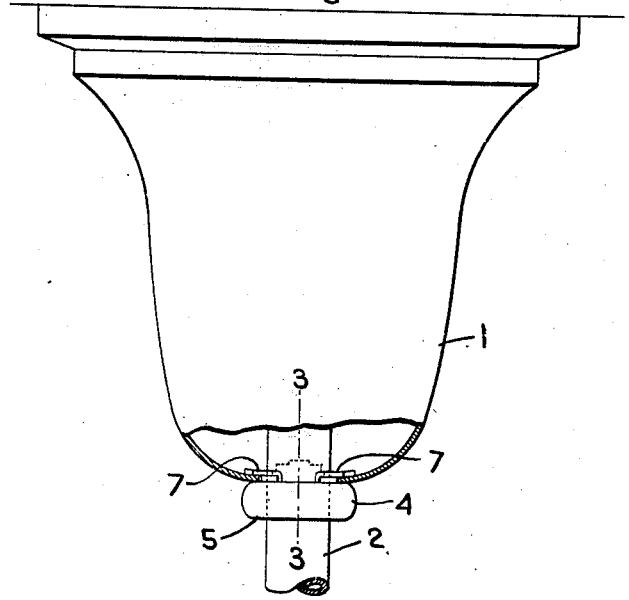
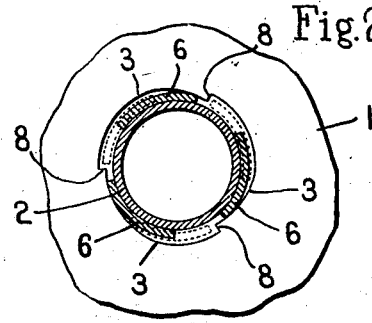
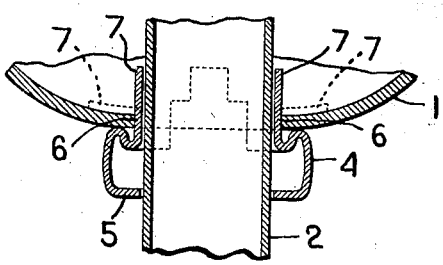
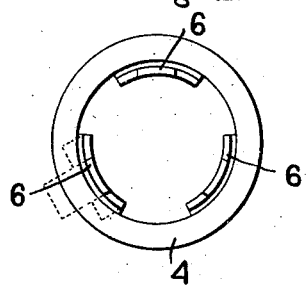
Inventor.
George W. Hoar
by Heard Smith & Tennant.
Attys.

UNITED STATES PATENT OFFICE.

GEORGE W. HOAR, OF WALTHAM, MASSACHUSETTS, ASSIGNOR, BY DIRECT AND MESNE ASSIGNMENTS, TO SERVICE ELECTRIC MANUFACTURING & SUPPLY COMPANY, A CORPORATION OF MASSACHUSETTS.

CANOPY FOR ELECTRIC-LIGHT FIXTURES.

1,380,147. Specification of Letters Patent. Patented May 31, 1921.

Application filed October 22, 1920. Serial No. 418,750.

*To all whom it may concern:*

Be it known that I, GEORGE W. HOAR, a citizen of the United States, residing at Waltham, county of Middlesex, State of Massachusetts, have invented an Improvement in Canopies for Electric-Light Fixtures, of which the following description, in connection with the accompanying drawing, is a specification, like characters on the drawing representing like parts.

This invention relates to devices such as are used to provide a suitable finish for openings in walls, floors, ceilings, etc., from which a pipe or rod extends and as illustrating one form of such device I will refer to canopies such as are used in connection with electric light fixtures for covering the hole in the wall or ceiling through which the wiring passes and for giving a desirable finish to the fixture.

The invention has for its object to provide a device of this sort with novel means for holding it firmly in place against the wall by frictional engagement with the pipe or rod.

These canopies or similar finish members are provided with a hole through which the fixture or other pipe or tube extends and my invention contemplates the provision of a clamping collar which surrounds the fixture or other pipe or rod and is swiveled to the canopy or other finish member, one of said latter parts having cam surfaces and the other having a resilient portion situated between the cam surfaces and the fixture or other pipe or tube whereby turning movement of the clamping collar will cause said resilient portion to be clamped firmly between the cam surfaces and the tube and to engage the tube with sufficient frictional engagement to hold the finish member in its proper position.

My improved clamping collar is neat in appearance, simple in construction, and accomplishes the desired result of holding the canopy or other fixture in place without the use of set-screws or screw-threads, both of which are more or less unsightly and detract from the pleasing appearance of a fixture.

I have illustrated my invention in the drawings as it might be embodied in a canopy for an electric light fixture and I will so describe it; but I desire to state that the invention is not necessarily limited to this particular use as the canopy is largely for the purpose of giving a finish to the wall, and the invention is equally applicable to other forms of finished members than canopies for electric light fixtures.

In the drawings, Figure 1 is a view of a canopy embodying my invention with a part broken out.

Fig. 2 is a section on the line 2—2 Fig. 3.

Fig. 3 is an enlarged section on line 3—3 Fig. 1.

Fig. 4 is a plan view of the clamping collar.

My improved canopy is especially designed for use with electric light fixtures, although the invention might be embodied in canopies used for other purposes if desired.

In the construction illustrated, 1 indicates the canopy which may be of any suitable or usual shape and which is provided with an opening to receive the lighting fixture indicated generally at 2. This opening in the canopy is formed with the cam or eccentric surfaces 3, the function of which will be presently set forth.

Associated with the canopy is a clamping collar indicated generally at 4. This clamping collar is formed with the head portion 5 which is situated exterior to the canopy and with a plurality of resilient arms 6 which are situated within the fixture-receiving opening of the canopy. I will preferably make the collar with as many arms 6 as there are cam surfaces 3 in the fixture opening of the canopy. This collar may be retained in position in any suitable way without departing from the invention. One simple construction which accomplishes this purpose is that herein shown wherein the resilient arms or fingers 6 are provided with extensions 7 which are bent outwardly after the collar is inserted into the opening and which when so bent outwardly overlie the inner face of the canopy thereby preventing the collar from being withdrawn.

The fingers 6 are resilient, as stated above, and when the collar is turned so that said fingers lie against the shoulders 8 of the canopy and occupy the portions of the openings of largest diameter, said fingers are free from frictional engagement with the fixture and the canopy is free to be moved longitudinally of the fixture toward or from the wall.

To clamp the canopy in place against the wall, the operator merely turns the collar so as to bring the fingers 6 into engagement with the cam faces 3, and the cam faces acting on the fingers force the latter inwardly into firm frictional engagement with the fixture 2, thus securely locking the canopy in place.

The collar 4 can conveniently be made of sheet metal which is formed into the desired shape, and when assembled with the canopy it presents the appearance of a bead at the end of the canopy which adds rather than detracts from the pleasing lines of the canopy. This clamping collar 4 is free from set-screws such as are sometimes used in connection with collars for holding a canopy in place and which are apt to detract from the appearance of the fixture.

My clamping collar is extremely inexpensive to manufacture and has the advantage that it will frictionally hold the canopy in place.

I claim:

1. In a device of the class described, the combination with a tube or pipe projecting from a wall, of a member surrounding the tube or pipe for giving the desired finish, and a clamping collar also surrounding the tube or pipe and swiveled to the member, one of said parts having resilient fingers and the other having cam faces acting on the fingers as the collar is turned thereby to cause said fingers to be clamped between the cam faces and the tube or pipe and to be forced against the pipe with sufficient pressure to hold the member from movement longitudinally of the pipe.

2. In a device of the class described, the combination with a canopy having a fixture-receiving opening provided with cam surfaces, of a clamping collar swiveled for turning movement in said opening and through which the fixture passes, said collar having a yielding portion situated between the cam surfaces and the fixture whereby when the collar is turned said yielding portion is clamped between the cam surfaces and the fixture and is forced against the fixture with sufficient frictional engagement to hold the canopy from movement longitudinally of the fixture.

3. In a device of the class described, the combination with a canopy having a fixture-receiving opening provided with cam surfaces, of a clamping collar swiveled for turning movement in said opening and provided with resilient fingers situated between the cam surfaces and the fixture whereby as the collar is turned, said fingers are wedged between the cam surfaces and fixture and are clamped against the latter with sufficient frictional engagement to hold the canopy from movement.

In testimony whereof, I have signed my name to this specification.

GEORGE W. HOAR.